US008874820B2

(12) United States Patent
Oh et al.

(10) Patent No.: US 8,874,820 B2
(45) Date of Patent: Oct. 28, 2014

(54) MECHANISM FOR FACILITATING A CONFIGURABLE PORT-TYPE PERIPHERAL COMPONENT INTERCONNECT EXPRESS/SERIAL ADVANCED TECHNOLOGY ATTACHMENT HOST CONTROLLER ARCHITECTURE

(75) Inventors: Kyutaeg Oh, San Ramon, CA (US); Conrad A. Maxwell, Herriman, UT (US)

(73) Assignee: Silicon Image, Inc., Sunnyvale, CA (US)

( * ) Notice: Subject to any disclaimer, the term of this patent is extended or adjusted under 35 U.S.C. 154(b) by 974 days.

(21) Appl. No.: 12/979,995

(22) Filed: Dec. 28, 2010

(65) Prior Publication Data
US 2012/0166701 A1 Jun. 28, 2012

(51) Int. Cl.
*G06F 13/36* (2006.01)
*G06F 13/38* (2006.01)

(52) U.S. Cl.
CPC .............. *G06F 13/36* (2013.01); *G06F 13/385* (2013.01)
USPC ......................................... 710/315; 710/305

(58) Field of Classification Search
USPC .................................................. 710/305, 315
See application file for complete search history.

(56) References Cited

U.S. PATENT DOCUMENTS

| 7,725,627 | B2 * | 5/2010 | Crain et al. ..................... 710/71 |
| 7,815,469 | B1 | 10/2010 | Nguyen et al. |
| 8,478,916 | B2 * | 7/2013 | Asnaashari ..................... 710/74 |
| 2005/0027900 | A1 | 2/2005 | Pettey et al. |
| 2007/0226385 | A1 | 9/2007 | Liu et al. |
| 2008/0294829 | A1 | 11/2008 | Khatri et al. |
| 2011/0231685 | A1 | 9/2011 | Huang et al. |

FOREIGN PATENT DOCUMENTS

| EP | 1632864 A2 | 3/2006 |
| KR | 10-2006-0080632 | 7/2006 |
| WO | WO 2006/026443 A2 | 3/2006 |
| WO | WO 2009/118582 A1 | 10/2009 |

OTHER PUBLICATIONS

PCT Search Report and Written Opinion for PCT/US2011/063105, Mailed Jul. 24, 2012.
Extended European Search Report, European Application No. 11853291.0, Apr. 25, 2014, 5 pages.

* cited by examiner

*Primary Examiner* — Glenn A Auve
(74) *Attorney, Agent, or Firm* — Fenwick & West LLP

(57) ABSTRACT

A mechanism for facilitating configuration of port-type Peripheral Component Interconnect Express/Serial Advanced Technology Attachment host controller architecture is described. In one embodiment, an apparatus includes a plurality of PHYs to be used as Peripheral Component Interconnect Express (PCIe) ports and Serial Advanced Technology Attachment (SATA) ports, and logic to facilitate swapping of one or more of the plurality of PHYs between being the PCIe ports and the SATA ports.

20 Claims, 8 Drawing Sheets

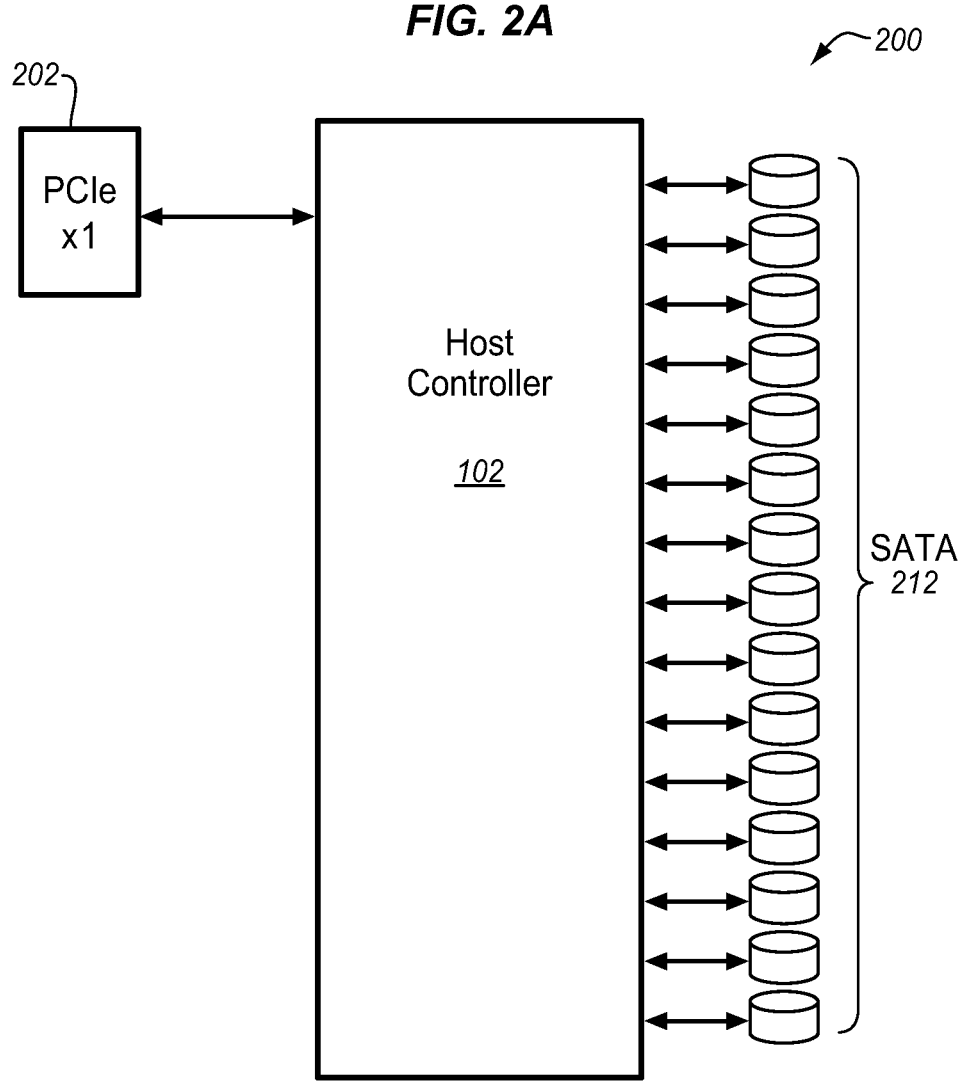

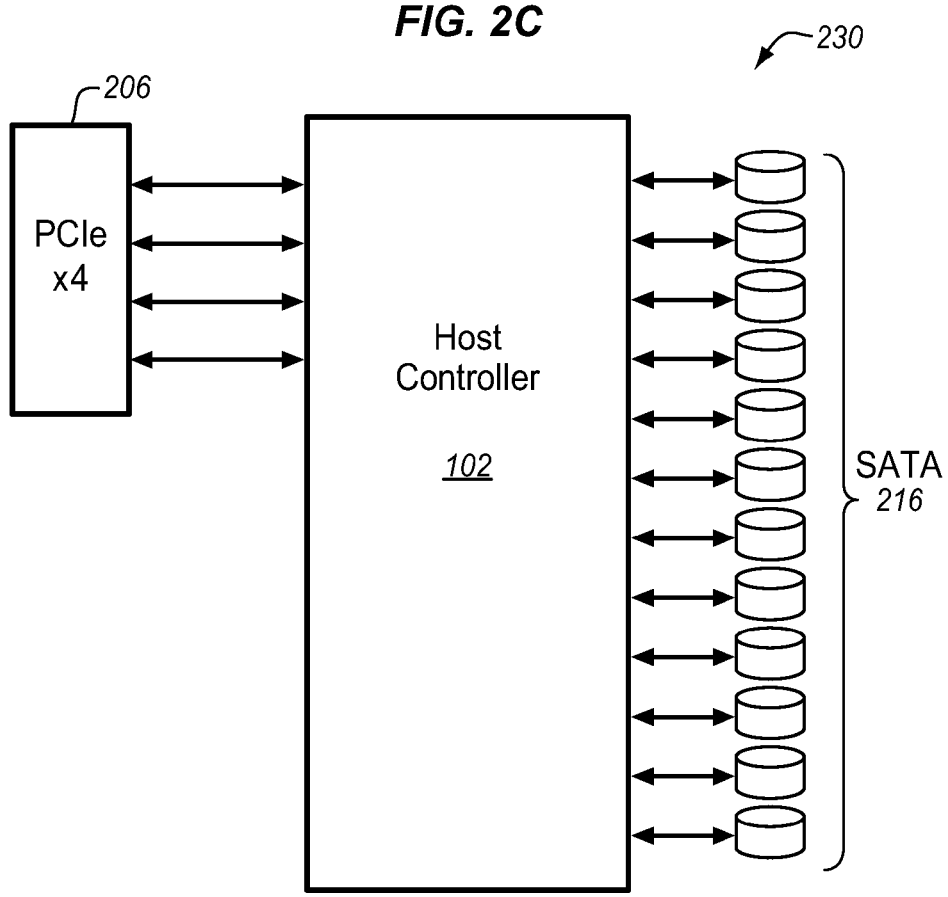
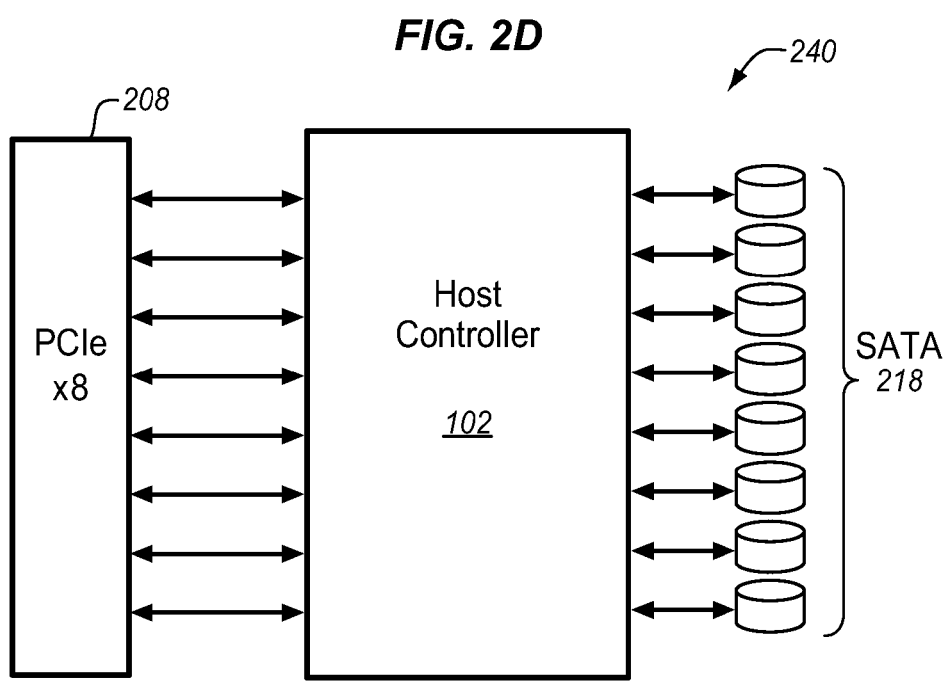

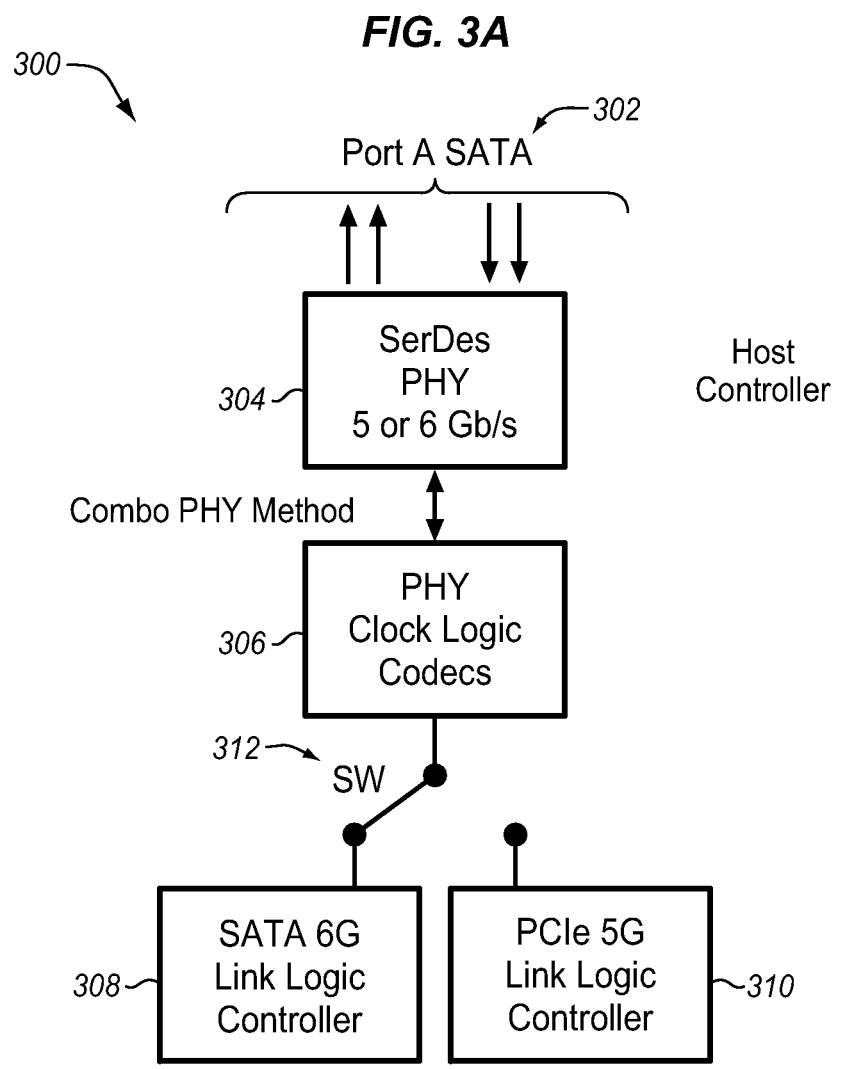

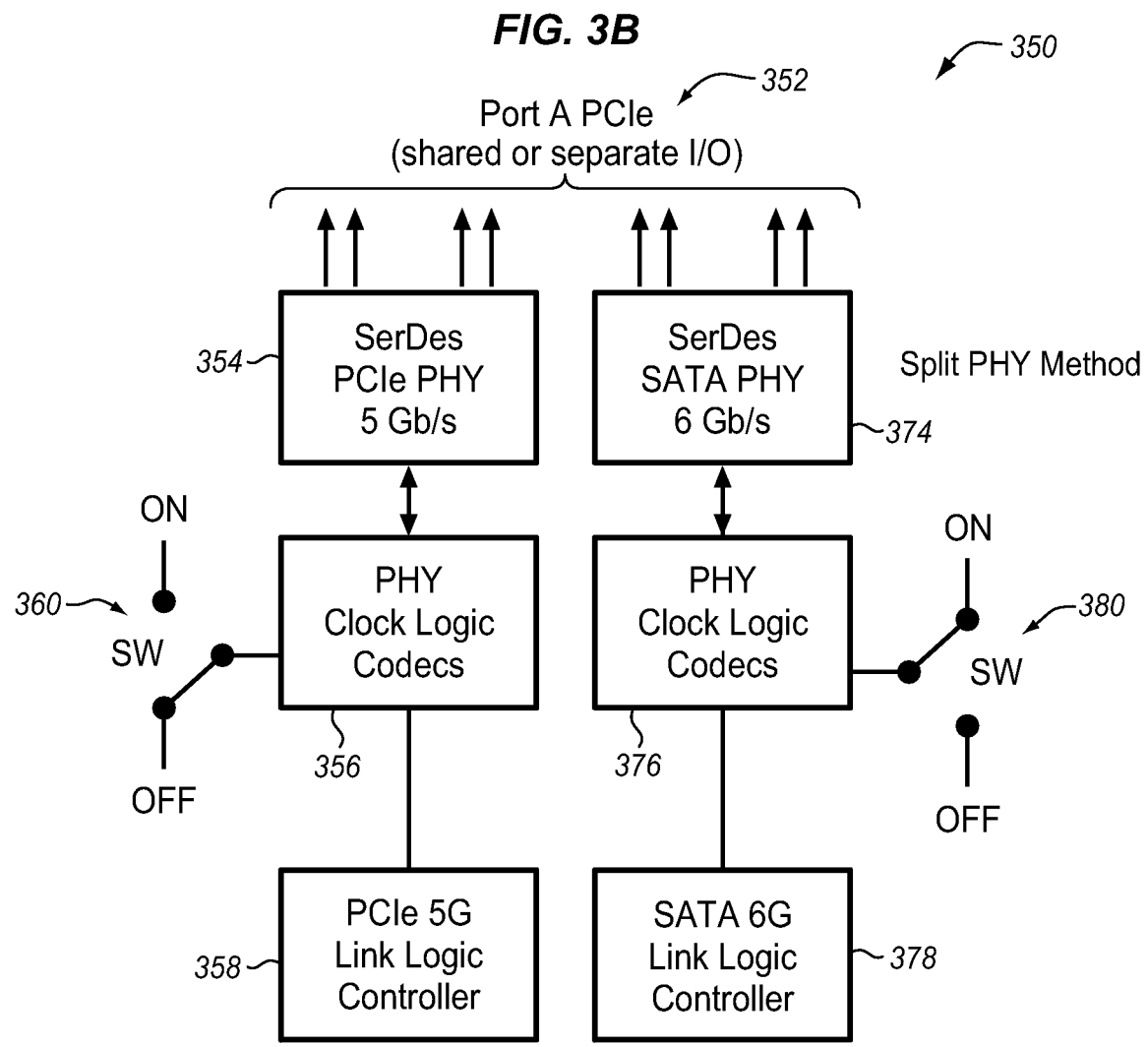

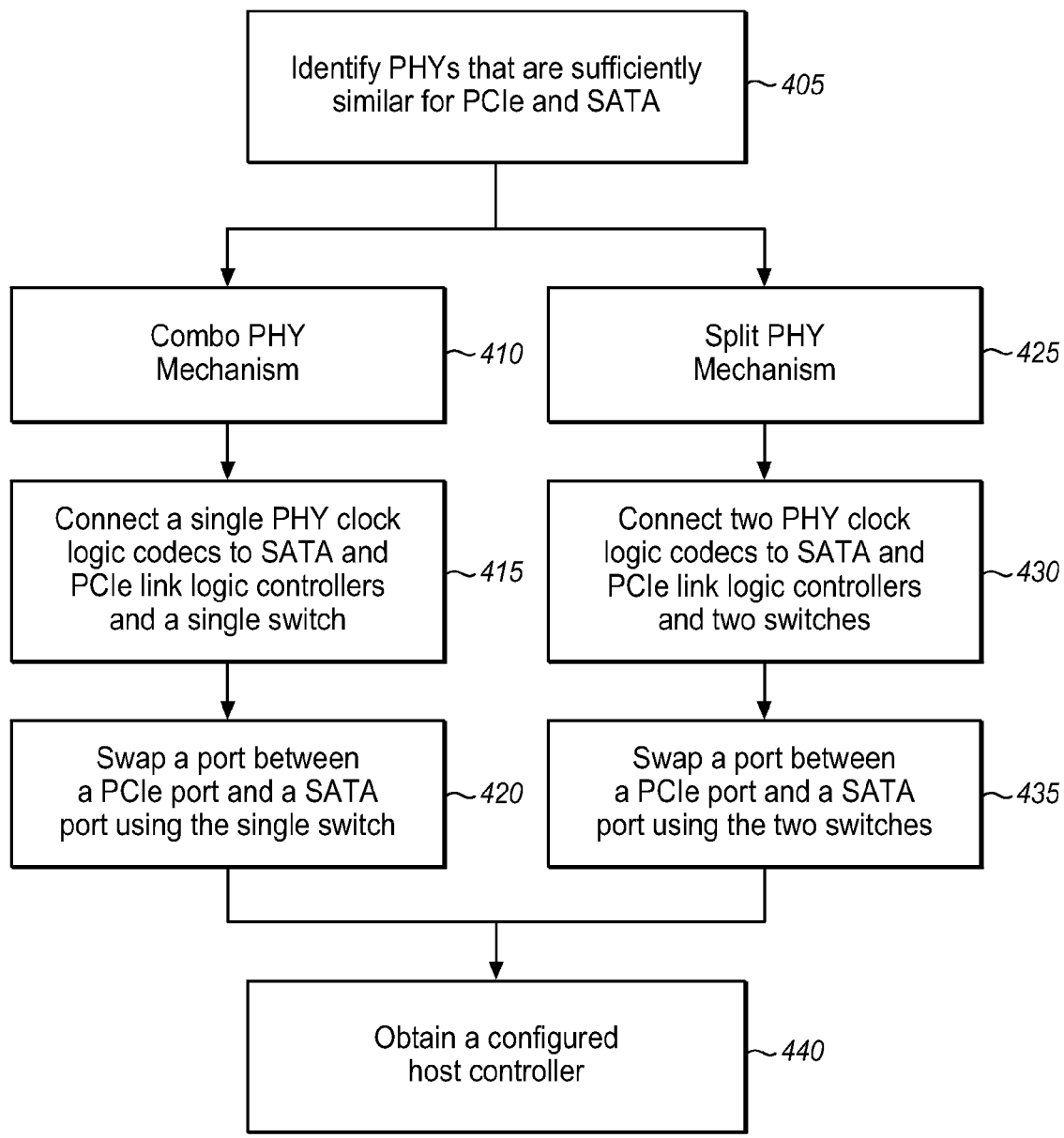

MECHANISM FOR FACILITATING A CONFIGURABLE PORT-TYPE PERIPHERAL COMPONENT INTERCONNECT EXPRESS/SERIAL ADVANCED TECHNOLOGY ATTACHMENT HOST CONTROLLER ARCHITECTURE

TECHNICAL FIELD

Embodiments of the invention generally relate to the field of networks and, more particularly, to a mechanism for facilitating a configurable port-type Peripheral Component Interconnect Express/Serial Advanced Technology Attachment host controller architecture.

BACKGROUND

A network may include an interconnection of multiple personal electronic devices. The various devices may be networked together in order to share data, increase convenience, and make fuller use of each element. For example, Serial Advanced Technology Attachment ("SATA" or "Serial ATA") is a well-known bus interface for connecting host bus adapters to other devices, such as disk drives, optical drives, solid state drives, etc. SATA is widely used in computer motherboards. Similarly, Peripheral Component Interconnect Express ("PCIe") refers to a computer expansion bus that is used in computer motherboards to link motherboard-mounted peripherals and add-in boards. However, today's host controllers are inflexible in terms of their fixed port designs and needing a different controller for each niche segment and consequently, requiring deployment of, for example, various types of storage servers for different web services. Further, for example, a typical conventional enterprise controller may require additional components, such as serial attached Small Computer System Interface ("SCSI") and protocol, battery backup memory, memory error correcting-code ("ECC") and controller redundancy, etc., which can result in the enterprise controller consuming around 7 Watts or more in a typical use and needing heat sinks, fans, etc., for cooling purposes.

SUMMARY

A mechanism for facilitating configuration of port-type PCIe/SATA host controller architecture is described.

In one embodiment, an apparatus includes a plurality of PHYs to be used as PCIe ports and SATA ports, and logic to facilitate swapping of one or more of the plurality of PHYs between being the PCIe ports and the SATA ports.

In one embodiment, a system includes an integrated circuit including a plurality of PHYs to be used as PCIe ports and SATA ports, and logic to facilitate swapping of one or more of the plurality of PHYs between being the PCIe ports and the SATA ports.

In one embodiment, a method includes identifying a plurality of PHYs to be used as PCIe ports and SATA ports, and swapping one or more of the plurality of PHYs between being the PCIe ports and the SATA ports.

BRIEF DESCRIPTION OF THE DRAWINGS

Embodiments of the invention are illustrated by way of example, and not by way of limitation, in the figures of the accompanying drawings in which like reference numerals refer to similar elements:

FIG. 2A illustrates a 1:15 PCIe to SATA port configuration setting of the 16-port PCIe/SATA host controller of FIG. 1 according to one embodiment of the invention;

FIG. 2C illustrates a 4:12 PCIe to SATA port configuration setting of the 16-port PCIe/SATA host controller of FIG. 1 according to one embodiment of the invention;

FIG. 2D illustrates a 8:8 PCIe to SATA port configuration setting of the 16-port PCIe/SATA host controller of FIG. 1 according to one embodiment of the invention;

FIG. 3A illustrates a combo port switch host controller configuration mechanism for configuring a PCIe or SATA port on a PCIe to SATA host controller according to one embodiment of the invention;

FIG. 3B illustrates a split port switch host controller configuration mechanism for configuring a PCIe or SATA port on a PCIe to SATA host controller according to one embodiment of the invention;

FIG. 4 illustrates a method for using port switch mechanisms for facilitating customized configuration of a PCIe/SATA host controller according to one embodiment of the invention.

DETAILED DESCRIPTION

Figure 1:
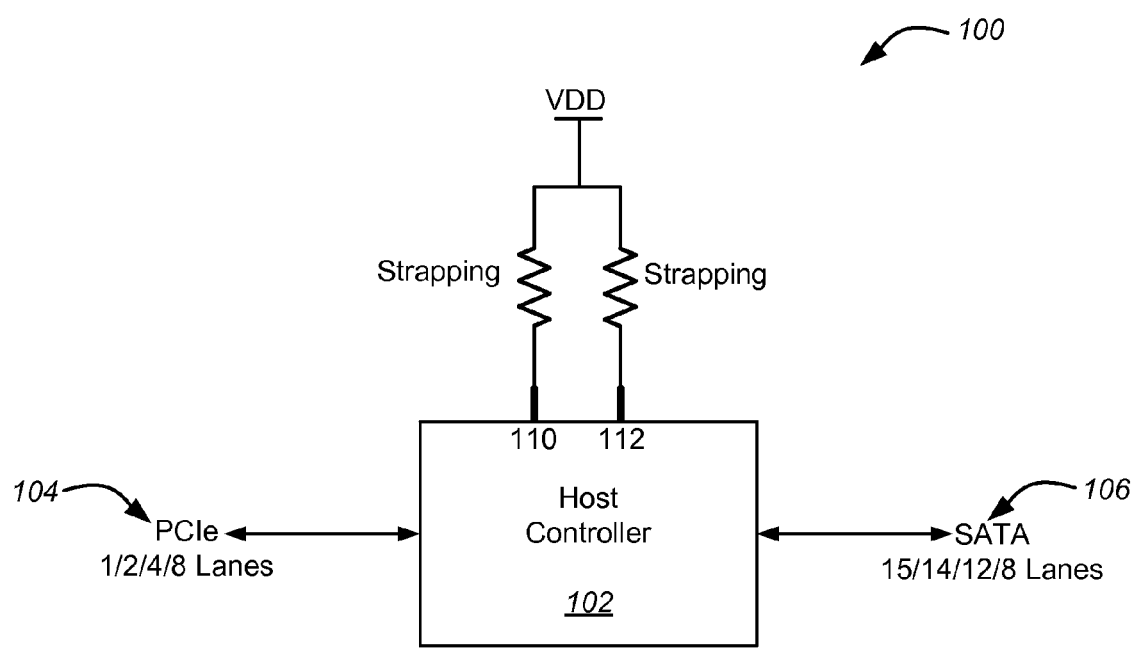
FIG. 1 illustrates a configurable PCIe to SATA host controller architecture according to one embodiment of the invention.

Embodiments of the invention are generally directed to facilitating configurable port-type PCIe/SATA host controller architecture.

As used herein, "network" or "communication network" mean an interconnection network to deliver digital media content (including music, audio/video, gaming, photos, and others) between devices. A network may include a personal entertainment network, such as a network in a household, a network in a business setting, or any other network of devices and/or components. In a network, certain network devices may be a source of media content, such as a digital television tuner, cable set-top box, video storage server, and other source device. Other devices may display or use media content, such as a digital television, home theater system, audio system, gaming system, or presented over the Internet in a browser, and other devices. Further, certain devices may be intended to store or transfer media content, such as video and audio storage servers. Certain devices may perform multiple media functions. In some embodiments, the network devices may be co-located in a single local area network. In other embodiments, the network devices may span multiple network segments, such as through tunneling between local area networks. The network may include multiple data encoding and encryption processes.

Embodiments provide a mechanism for facilitating a configurable or customizable SATA/PCIe controller, such as a single chip customizable SATA/PCIe controller ("host controller") whose selected ports can be configured to be used as SATA or PCIe and thus enabling a variety of single- and multiple-lane PCIe configurations on a single chip. This way, a user (e.g., system designer, system administrator, etc.) may choose one of a fixed set of configurations to match the performance and/or connectivity requirements of a target computer system. A chip refers to an integrated circuit (IC) which includes an electronic circuit mainly consisting of semiconductor devices. The host controller, in one embodiment, supports four modes that are configured by strapping pins (e.g., 110 and 112 of FIG. 1) before power is applied to the part. It may include 16 high speed ports, with 7 ports that can be either SATA or PCIe. This unique flexibility allows for deploying this single controller-based server architecture across a much wider spectrum of server architectures. Further, companies can deploy optimized storage solutions for different needs while maintaining a single driver and a single point of contact, providing real benefits to the technology and operation teams with regard to maintenance and configuration.

Moreover, in one embodiment, this simple SATA host controller provides enough ports to be used by a low-cost server by removing traditionally costly items (e.g., battery backup memory), Serial Attached Small Computer System Interface ("Serial Attached SCSI" or "SAS") support, and consequently, significantly reducing the power consumption (e.g., 2 Watts as opposed to a traditional 7 Watts for a typical use) while increasing the number of SATA ports (e.g., 15 SATA ports). This combination can significantly reduce the cost, such as when compared to a traditional 8-port enterprise server model. For example, in one embodiment, the host controller can support hard drives or solid state drives that can be configured to four different performance levels, ranging from an 8-SATA port solid-state drive ("SSD") to a 15-SATA port hard disk drive ("HDD"). It is contemplated that the embodiments are not limited to a host controller having 16 ports with 7 flexible ports (e.g., Green cloud products) and that they include and allow for other larger and smaller topologies as well, such as a 16-lane PCIe.

FIG. 1 illustrates a configurable PCIe to SATA host controller architecture 100 according to one embodiment of the invention. In one embodiment, the PCIe/SATA host controller architecture 100 includes a PCIe/SATA host controller 102 having 16 ports. As aforementioned, it is to be noted that embodiments of the invention are not limited to the host controller 102 illustrated here and that they are applicable to other forms of host controllers of topologies both smaller and larger than what is discussed here. The host controller 102 is discussed throughout this document for brevity, clarity, and ease of understanding.

In one embodiment, on the same chip, the host controller 102 can be configured or customized to include various combinations of 8 PCIe ports 104 and 8 SATA ports 106. For example, given that physical layer or PHY for PCIe (e.g., PCIe 2.0) and SATA (e.g., SATA 3.0 (5G/6G)) are sufficiently similar to be reused if the associated backend logic is directly switchable and transparent. A complete support chain for each function might be behind the multipurpose PHY to offer simple reuse while eliminating inefficiencies. As will be further described with reference to the subsequent figures, in one embodiment, for example, some of the PCIe back-end logic may be swapped out for SATA back-end logic (e.g., having 1, 2, 4, or 8 PCIe ports to accommodate 15, 14, 12, or 8 SATA ports, respectively) without wasting any PHY in creating this superior, efficient, and novel host controller architecture 100.

In this illustrated embodiment of the host controller 102, having the flexibility to accommodate up to 15 SATA ports 106 means 7 more SATA ports than a conventional host controller that is fixed to only 8 SATA ports. This flexibility maximizes usage and efficiency (e.g., die efficiency, package efficiency) while decreasing cost and complexity. Various combinations of the PCIe and SATA ports 104, 106 are provided with reference to FIGS. 2A-2D.

FIG. 2A illustrates a 1:15 PCIe to SATA port configuration setting 200 of the 16-port PCIe/SATA host controller 102 of FIG. 1 according to one embodiment of the invention. In one embodiment, the 8 PCIe ports of the host controller 102 (as illustrated in FIG. 1) are reduced to a 1-port or 1-lane PCIe 202 by swapping out 7 PCIe ports to allow them to be used as SATA ports. Hence, the configuration setting 200 provides the host controller 102 as having 15 SATA ports 212 and 1 PCIe port 202.

Figure 2B:
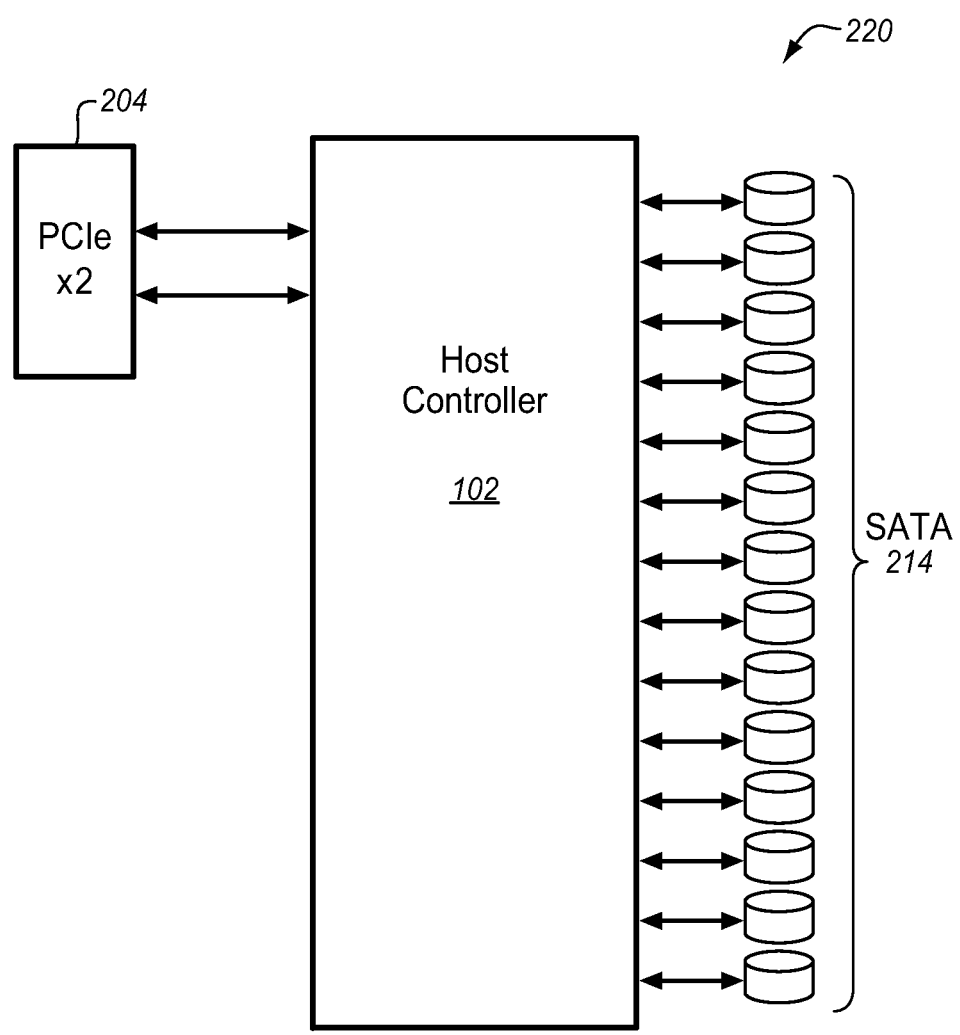
FIG. 2B illustrates a 2:14 PCIe to SATA port configuration setting of the 16-port PCIe/SATA host controller of FIG. 1 according to one embodiment of the invention.

FIG. 2B illustrates a 2:14 PCIe to SATA port configuration setting 220 of the 16-port PCIe/SATA host controller 102 of FIG. 1 according to one embodiment of the invention. In this embodiment, 6 of the 8 PCIe ports of the host controller 102 are swapped out to be used as SATA ports. Accordingly, in one embodiment, the configuration setting 220 provides the host controller 102 as having 14 SATA ports 214 and 2 PCIe ports 204.

FIG. 2C illustrates a 4:12 PCIe to SATA port configuration setting 230 of the 16-port PCIe/SATA host controller 102 of FIG. 1 according to one embodiment of the invention. In this embodiment, the 8 PCIe ports are reduced in half to 4 ports by swapping out the other 4 ports to be used as SATA ports. Accordingly, the configuration setting 230 illustrates the host controller 102 as having 12 SATA ports 216 and 4 PCIe ports 206.

FIG. 2D illustrates an 8:8 PCIe to SATA port configuration setting 240 of the 16-port PCIe/SATA host controller 102 of FIG. 1 according to one embodiment of the invention. As with the configuration settings 200, 220, 230 of FIGS. 2A-2C, in this embodiment, all 8 PCIe lanes or ports 208 are used which limits the use of SATA ports 218 to 8. Hence, the configuration setting 240 provides the host controller 102 as having 8 SATA ports 218 and 8 PCIe ports 208.

FIG. 3A illustrates a combo port switch host controller configuration mechanism 300 for configuring a PCIe to SATA port on a PCIe to SATA host controller according to one embodiment of the invention. In one embodiment, a combo PHY port switch host controller configuration mechanism ("combo PHY mechanism") 300 is provided to facilitate configuration of a host controller by port switching at the PHY level. As aforementioned, in one embodiment, PHYs for PCIe (e.g., PCIe 2.0 5 Gb/s) and SATA (e.g., SATA 3.0 6 Gb/s) are sufficiently similar that they can be swapped and reused with an associated backend logic that is directly switchable and transparent.

In this embodiment, a SATA port 302, a single serializer/deserializer ("SerDes") PHY 304 (e.g., SerDes PHY 5 Gb/s or 6 Gb/s) that supports both a SATA 6 Gb/s link logic controller 308 and a PCIe 5 Gb/s link logic controller 310, and a PHY clock logic codecs 306 are provided in a combo PHY mechanism 300. The PHY clock logic codecs 306 is further connected with the two link logic controllers 308, 310 via a switch 312. The combo PHY mechanism 300 provides a combination of the two link logic controllers 308, 310 that are connected to the single PHY clock logic codecs 306 through the single switch 312. In one embodiment, the swapping between PCIe and SATA may be performed by simply turning the switch 312. For example, when the switch 312 is turned to SATA link logic controller 308, the applicable port is dedicated to SATA, and when the switch 312 is turned to PCIe link logic controller 310, the application port is dedicated to PCIe.

FIG. 3B illustrates a split port switch host controller configuration mechanism 350 for configuring a PCIe or SATA port on a PCIe to SATA host controller according to one embodiment of the invention. In one embodiment, a split port switch host controller configuration mechanism ("switch PHY mechanism") 350 is provided to facilitate configuration of a host controller by port switching at the PHY level. In one embodiment, two separate SerDes for PCIe PHY 5 Gb/s 354 and SATA PHY 6 Gb/s 374 are provided for a PCIe port (which may be shared or separate input/output (I/O)) and are shown as being in communication with their respective PHY clock logic codecs 356 and 376. The two PHY clock logic codecs 356, 376 are shown as being connected with a PCI 5 Gb/s link logic controller 358 and a SATA 6 Gb/s link logic controller 378 and further with their respective switches 360 and 380.

In the illustrated embodiment, the PCIe port 352 is shown as being used as a SATA port by turning on the application switch 380 to connect the SATA link logic controller 378 with the PHY clock logic codecs 376 and the SerDes SATA PHY 374, while the other switch 360 is shown as being turned off and thus, not allowing the port 352 to be used as a PCIe port 358. In one embodiment, if switch 360 is turned on, the port 352 can be used as a PCIe port, while the other switch 380 may be turned off to stop using the port 352 as a SATA port.

FIG. 4 illustrates a method 400 for using port switch mechanisms for facilitating customized configuration of a PCIe/SATA host controller according to one embodiment. Method 400 begins with identifying PHYs that are sufficiently similar for PCIe and SATA at block 405. In one embodiment, in case of a combo PHY mechanism, at block 410, connecting a single PHY clock logic codecs to a SATA link logic controller and a PCIe link logic controller via a single switch at block 415. Swapping a port between being a PCIe port and being a SATA port by turning the switch to the PCIe link logic controller and the SATA link logic controller, respectively, at block 420. Hence, a configured host controller is obtained at block 440.

In another embodiment, in case of a split PHY mechanism, at block 425, two PHY clock logic codecs are employed and one of the PHY clock logic codecs is connected with a PCIe link logic controller and the other one is connected with a SATA link logic controller at block 430. The PHY clock logic codecs are further connected with a couple of switches that used to swap a port between being a PCIe port and being a SATA port at block 435. For example, if the SATA-side switch is off and the PCIe-side switch is on, the port is transformed into behaving as a PCIe port or line. Conversely, if the SATA-side switch is on and the PCIe-side switch is off, the port acts as a SATA port. Hence, a configured host controller is obtained at block 440.

Figure 5:
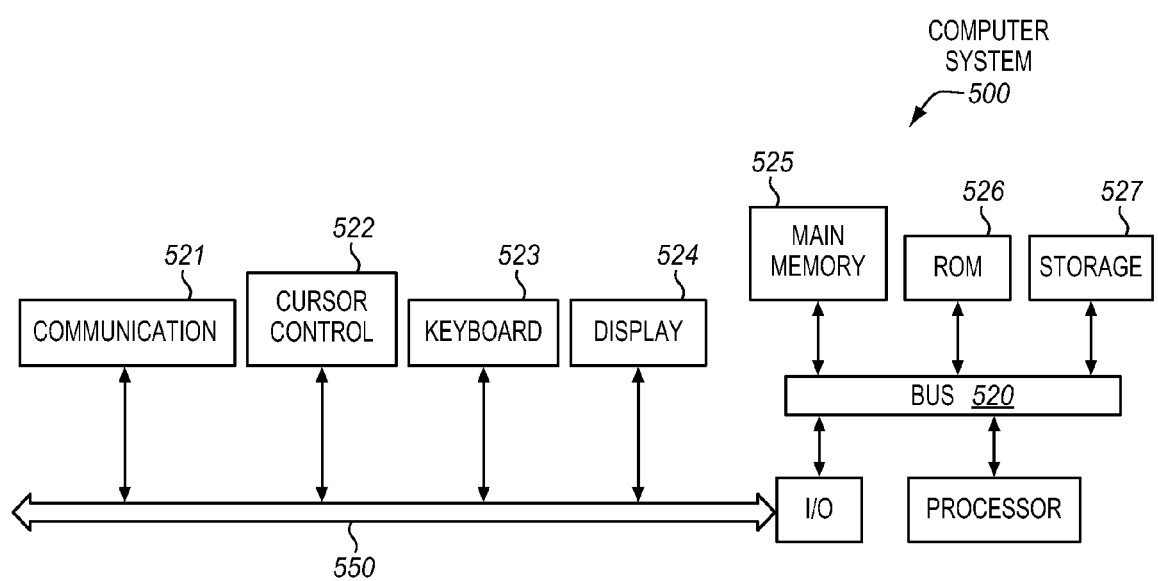
FIG. 5 illustrates a computer system according to one embodiment of the invention.

FIG. 5 illustrates a computer system 500 on which embodiments of the present invention may be implemented. Computer system 500 includes a system bus 520 for communicating information, and a processor 510 coupled to bus 520 for processing information. According to one embodiment, processor 510 is implemented using one of the multitudes of microprocessors. Nevertheless one of ordinary skill in the art will appreciate that other processors may be used.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second input/output (I/O) bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients) via external data network. The communication device 521 may comprise a modem, a network interface card, or other well-known interface device, such as those used for coupling to Ethernet, token ring, or other types of networks. Computer system 500 includes, but is not limited to, a network computer device, a mobile telephone, a personal data assistant (PDA), etc.

Computer system 500 may be interconnected in a client/server network system. A network may include a Local Area Network (LAN), Wide Area Network (WAN), Metropolitan Area Network (MAN), intranet, the Internet, etc. As stated elsewhere in this document, any number of network devices can be cascaded into being connected with a port multiplier forming a networking mechanism within a network. It is contemplated that there may be any number of devices connected via the network. A device may transfer data streams, such as streaming media data, to other devices in the network system via a number of standard and non-standard protocols, including the protocols described in this document.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

One or more modules, components, or elements described throughout this document, such as the ones shown within or associated with an embodiment of a port multiplier enhancement mechanism may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), EEPROM, magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
    a plurality of PHYs to be used as Peripheral Component Interconnect Express (PCIe) ports and Serial Advanced Technology Attachment (SATA) ports;
    at least one pin to be strapped before power is applied to the apparatus; and
    logic to facilitate swapping of one or more of the plurality of PHYs between being the PCIe ports and the SATA ports based on the strapping of the at least one pin.

2. The apparatus of claim 1, further comprising a single switch to trigger the logic to facilitate swapping between a PCIe port and a SATA port.

3. The apparatus of claim 1, further comprising multiple switches to trigger the logic to facilitate swapping between the PCIe port and the SATA port.

4. The apparatus of claim 1, wherein the plurality of PHYs include 16 PHYs having a combination of 1 PCIe port and 15 SATA ports.

5. The apparatus of claim 1, wherein the plurality of PHYs include 16 PHYs having a combination of 2 PCIe ports and 14 SATA ports.

6. The apparatus of claim 1, wherein the plurality of PHYs include 16 PHYs having a combination of 4 PCIe ports and 12 SATA ports.

7. The apparatus of claim 1, wherein the plurality of PHYs include 16 PHYs having a combination of 8 PCIe ports and 8 SATA ports.

8. A system comprising:
    an integrated circuit having:
    a plurality of PHYs to be used as Peripheral Component Interconnect Express (PCIe) ports and Serial Advanced Technology Attachment (SATA) ports;
    at least one pin to be strapped before power is applied to the integrated circuit; and
    logic to facilitate swapping of one or more of the plurality of PHYs between being the PCIe ports and the SATA ports based on the strapping of the at least one pin.

9. The system of claim 8, further comprising a single switch to trigger the logic to facilitate swapping between a PCIe port and a SATA port.

10. The system of claim 8, further comprising multiple switches to trigger the logic to facilitate swapping between the PCIe port and the SATA port.

11. The system of claim 8, wherein the plurality of PHYs include 16 PHYs having a combination of 1 PCIe port and 15 SATA ports.

12. The system of claim 8, wherein the plurality of PHYs include 16 PHYs having a combination of 2 PCIe ports and 14 SATA ports.

13. The system of claim 8, wherein the plurality of PHYs include 16 PHYs having a combination of 4 PCIe ports and 12 SATA ports.

14. The system of claim 8, wherein the plurality of PHYs include 16 PHYs having a combination of 8 PCIe ports and 8 SATA ports.

15. A method comprising:
    identifying a plurality of PHYs to be used as Peripheral Component Interconnect Express (PCIe) ports and Serial Advanced Technology Attachment (SATA) ports;
    strapping at least one pin before power is applied; and
    swapping one or more of the plurality of PHYs between being the PCIe ports and the SATA ports based on the strapping of the at least one pin.

16. The method of claim 15, further comprising swapping between a PCIe port and a SATA port using a single switch.

17. The method of claim 15, further comprising swapping between the PCIe port and the SATA port using multiple switches.

18. The method of claim 15, wherein the plurality of PHYs include 16 PHYs having a combination of 1 PCIe port and 15 SATA ports.

19. The method of claim 15, wherein the plurality of PHYs include 16 PHYs having a combination of 2 PCIe ports and 14 SATA ports.

20. The method of claim 15, wherein the plurality of PHYs include 16 PHYs having a combination of 4 PCIe ports and 12

SATA ports, and wherein the plurality of PHYs include 16 PHYs having a combination of 8 PCIe ports and 8 SATA ports.

* * * * *